United States Patent
Ausschnitt et al.

[11] Patent Number: 5,914,784
[45] Date of Patent: Jun. 22, 1999

[54] MEASUREMENT METHOD FOR LINEWIDTH METROLOGY

[75] Inventors: Christopher P. Ausschnitt, Brookfield; Timothy A. Brunner, Ridgefield, both of Conn.

[73] Assignee: International Business Machines Corporation, Armonk, N.Y.

[21] Appl. No.: 08/940,722

[22] Filed: Sep. 30, 1997

[51] Int. Cl.⁶ .................................................. G01B 11/02
[52] U.S. Cl. .................... 356/375; 356/384; 250/559.36
[58] Field of Search .................................. 356/372, 375, 356/384; 250/559.36

[56] References Cited

U.S. PATENT DOCUMENTS

| | | |
|---|---|---|
| 3,689,162 | 9/1972 | Ferguson . |
| 4,186,301 | 1/1980 | Basire et al. . |
| 4,529,314 | 7/1985 | Ports ........................................ 356/375 |
| 4,555,798 | 11/1985 | Broadbent, Jr. et al. ............... 356/237 |
| 4,568,189 | 2/1986 | Bass et al. .............................. 356/401 |
| 4,596,037 | 6/1986 | Bouchard et al. ...................... 356/384 |
| 4,659,936 | 4/1987 | Kikkawa et al. ....................... 356/387 |
| 4,783,826 | 11/1988 | Koso . |
| 4,820,055 | 4/1989 | Müller .................................... 356/401 |
| 4,835,402 | 5/1989 | Guillaume .............................. 356/382 |
| 4,853,967 | 8/1989 | Mandeville . |
| 4,893,346 | 1/1990 | Bishop . |
| 4,908,656 | 3/1990 | Suwa et al. .............................. 355/53 |
| 4,908,871 | 3/1990 | Hara et al. . |
| 4,981,372 | 1/1991 | Morimoto et al. ..................... 356/375 |
| 5,103,104 | 4/1992 | Tissier et al. ........................... 356/376 |
| 5,119,436 | 6/1992 | Holdgrafer . |
| 5,216,257 | 6/1993 | Brueck et al. .......................... 356/401 |
| 5,239,170 | 8/1993 | Hughlett ............................. 250/201.3 |
| 5,262,258 | 11/1993 | Yanagisawa ............................. 430/22 |
| 5,272,763 | 12/1993 | Maruyama et al. . |
| 5,309,198 | 5/1994 | Nakagawa ................................ 355/67 |
| 5,386,294 | 1/1995 | Ototake et al. ......................... 356/401 |
| 5,402,224 | 3/1995 | Hirukawa et al. ..................... 356/124 |
| 5,418,613 | 5/1995 | Matsutani .............................. 356/401 |
| 5,483,345 | 1/1996 | Donaher et al. ....................... 356/363 |
| 5,629,772 | 5/1997 | Ausschnitt ............................. 356/372 |

FOREIGN PATENT DOCUMENTS

| | | |
|---|---|---|
| 214920 | 10/1984 | Germany . |
| 57-60206 | 4/1982 | Japan . |

OTHER PUBLICATIONS

Electrical Measurements for Characterizing Lithography, VLSI Electronics Microstructure Science, by Christopher P. Ausschnitt, vol. 16, pp. 320–356, 1987.

IBM Technical Disclosure Bulletin, "Measuring Fine Patterns", vol. 35, No. 4B, Sep. 1992.

*Primary Examiner*—F. L. Evans
*Attorney, Agent, or Firm*—DeLio & Peterson, LLC; Peter W. Peterson; Tiffany L. Townsend

[57] ABSTRACT

A method of determining the edge of an object by microscopy, such as an optical microscopy system or a scanning electron microscopy system. The edge of the object is viewed at a first focus value, and the image signal profile of the object edge is then measured at the first focus value. The object edge is then viewed at a second focus value different from the first focus value and the image signal profile of the object edge is measured at the second focus value. The location of the object edge is determined by comparing the image signal profiles of the object edge at the first and second focus values. For example, determination of the location of the object edge is by an isofocal point of the profiles. Alternatively, prior to the determination of the location of the object edge, the object edge is viewed at a third focus value different from the first and second focus values and the image signal profile of the object edge is measured at the third focus value. Determination of the location of the object edge is then made by calculating the variance of the profiles and determining a minimum of the variance. The object edge may be viewed and the image signal profiles measured at different phases or different light colors, and the determination of the location of the object edge may include comparing the image signal profiles of the object edge at the different phases or different light colors.

25 Claims, 7 Drawing Sheets

MEASUREMENT METHOD FOR LINEWIDTH METROLOGY

BACKGROUND OF THE INVENTION

1. Field of the Invention

The present invention relates to lithographic processing of semiconductors and, in particular, to a method of detecting and measuring edges of features using imaging apparatus.

2. Description of Related Art

A general problem in the field of lithographic processing of semiconductors is to accurately measure the dimensions of an object which has been imaged by some apparatus. As used herein, imaging apparatus includes optical microscopes and scanning electron microscopes (SEMs). An example of such problem in lithographic processing of semiconductors is the measurement of the line width of a resist line on a silicon wafer, as would be formed during the fabrication of integrated circuits (ICs), with an optical microscope. In this example, the image of the resist is darker than the image of the wafer which has no resist. The line width measurement is therefore equivalent to the measurement of the width of the dark region of the image. However, in the imaging signal profile of the edge of an object such as the resist line, the transition from bright to dark is never perfectly sharp. Rather, it has been found that the signal profile generally exhibits a transition region between the dark (resist) area and the bright (silicon) area which may obscure and interfere with the determination of the exact dimensions. The problem that has been found is, in an imaging metrology system, how does one start with the image intensity profile and determine an accurate dimensional measurement.

Commercial equipment for IC pattern metrology has addressed this problem in several ways in the past. In one widely used technique, a signal threshold algorithm has been used to determine the pattern edge, e.g., the edge is assumed to be at a signal level half-way between the maximum and the minimum signal. Another algorithm might be to use the signal maximum, or the signal minimum, or the part of the profile with the steepest slope. The present invention describes a new algorithm for determining dimensional measurements based on imagining metrology signal profiles.

Figure 1:
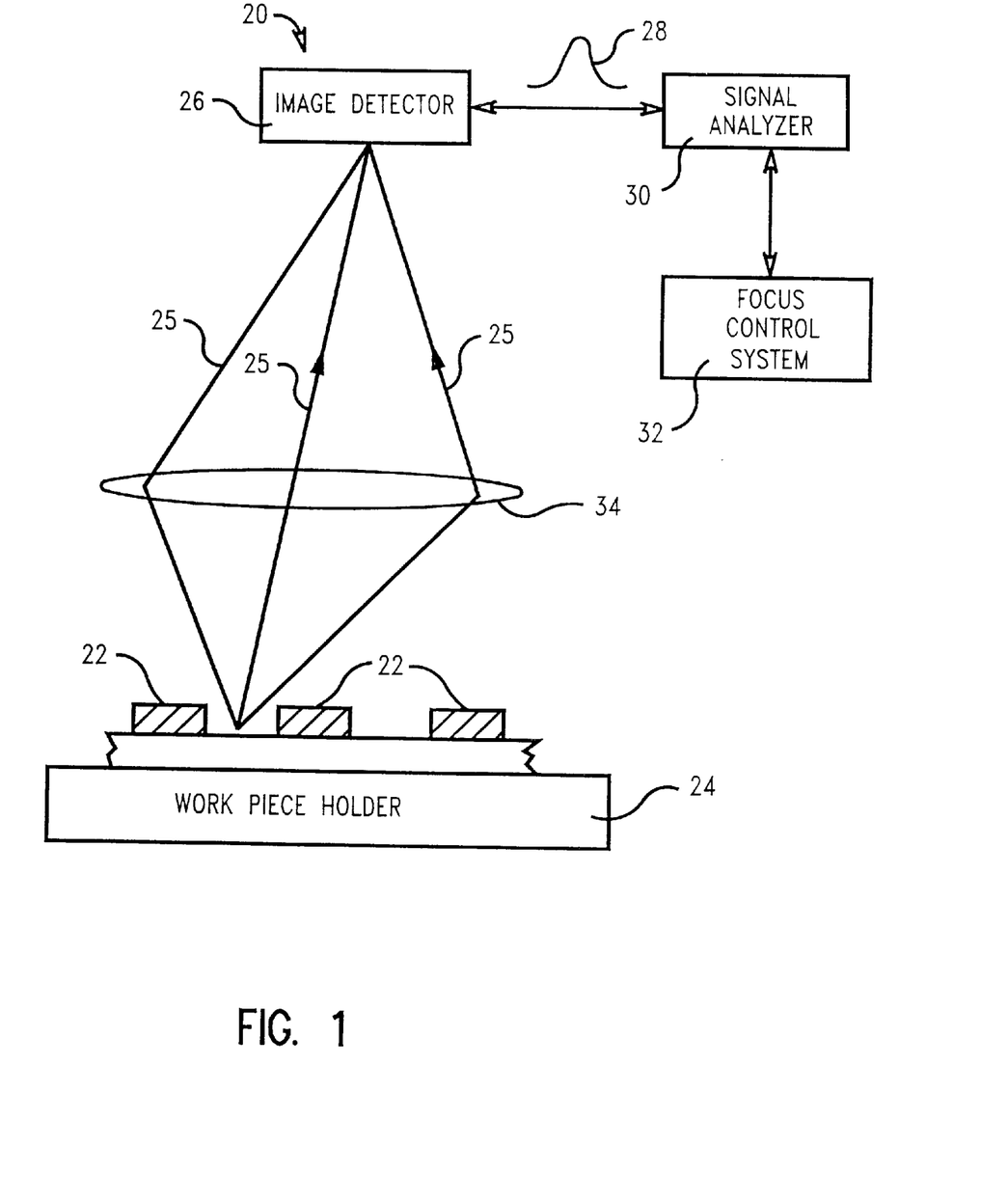
FIG. 1 is a block diagram of prior art imaging apparatus used for measurement.

FIG. 1 illustrates a general block diagram of such a prior art system where an imaging system 20 creates an image of a test object 22 on a workpiece holder 24 which passes as imaging radiation 25 through lens 24 and is picked up by an image detector 26. The measurement apparatus includes a focus control system 32 to adjust the imaging optics (lens) 34 and the resulting imaging radiation 25. The image of the test object outputted by the image detector as an electronic image signal profile 28, which is analyzed by a signal analyzer 30 to obtain the final measurement results. The signal analyzer may also send the results to the focus control system for adjustment of the imaging optics.

Figure 2A:
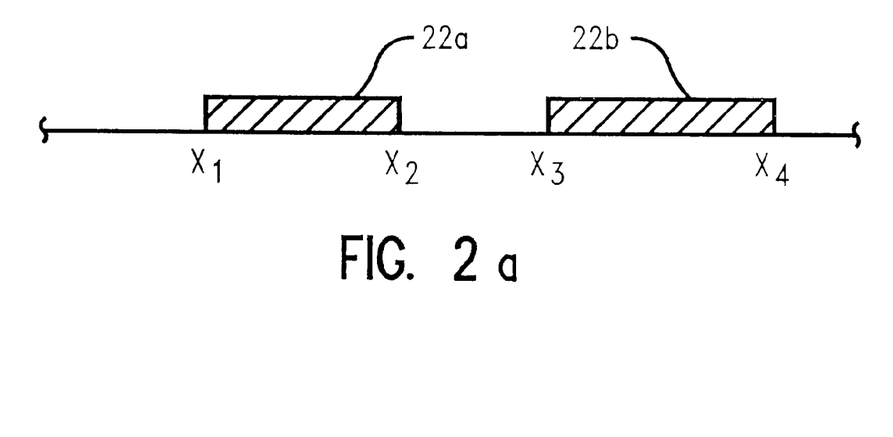
FIG. 2a is a elevational view of a pair of test lines (objects) taken normal to the length of the lines.

A test object may contain, for example, two parallel lines which are to be measured. In an IC fabrication process, these lines might be thin metal patterns which are on a silicon wafer substrate. FIG. 2a shows a vertical cross section through test object lines 22a, 22b, cut perpendicular to the length of the lines. To measure the linewidth W of left line 22a, one must know the positions of the two edges, $x_1$ and $x_2$, whereby the width W is equal to $x_1-x_2$. The center $X_{left}$ of the left line can be determined as $X_{left}=(x_1+x_2)/2$. And similarly the center of the right line is $X_{right}=(x_3+x_4)/2$. The distance between the centers of the two lines, which relates to overlay error measurements, can be given by the expression:

$$\Delta X=(x_3+x_4-x_1-x_2)/2.$$

Linewidth measurement, overlay error measurement, and line center determination for wafer alignment are crucial in semiconductor process control. All of these measurements depend on precise determination of line edge position.

Figure 2B:
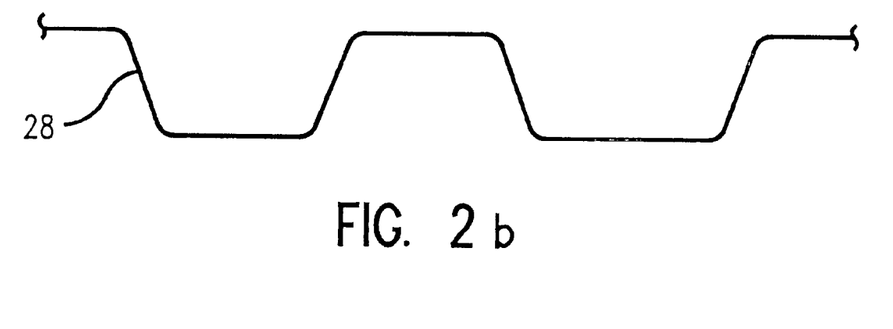

The imaging apparatus will acquire an image signal profile from which may be derived the line edge positions. A signal profile 28 is shown in FIG. 2b of test lines 22a, 22b from the view of FIG. 2a. Because of the finite resolution of the imaging optics, the signal profile does not have sharp edges, even though the assumed test object does. In the neighborhood of the line edge, the signal profile is sloped, and may have a more complicated structure. Because it is not apparent what point in the signal profile corresponds to an edge of the object, there is uncertainty in the dimensional measurement based on the object edges.

Figure 2C:
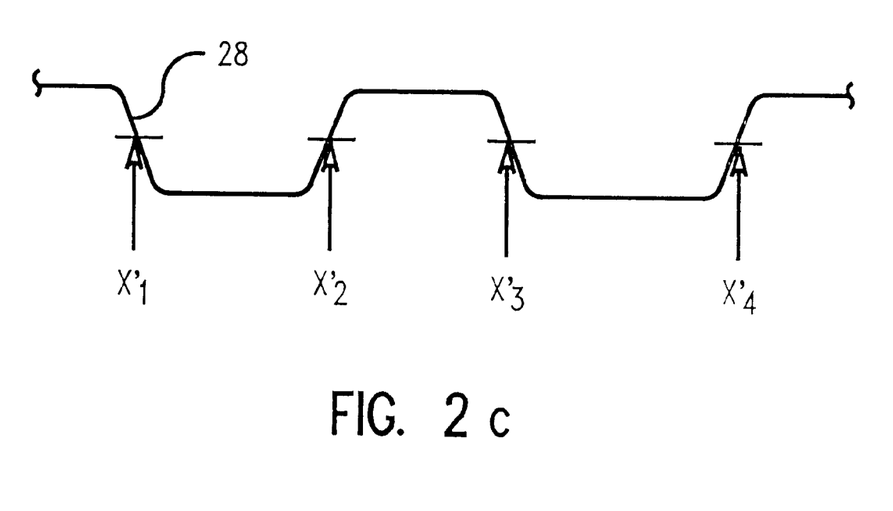
FIG. 2c is a threshold analysis of the signal profile of FIG. 2b to determine edges, at a 50% threshold.

The most common method of determining edge positions from signal profiles is the threshold algorithm. In this technique, the signal profile is examined in the neighborhood of the assumed edge to determine a maximum signal level and a minimum signal level. The algorithm then assumes a threshold level chosen by the user, where 0% is the minimum and 100% is the maximum. The threshold algorithm locates the edge at the position where the signal level crosses the threshold level. This algorithm is illustrated in FIG. 2c for a typical choice of 50% threshold level. Since the edge position will depend on the threshold level, the user must make a careful choice. The edge positions determined by the threshold algorithm $x'_1$, $x'_2$, $x'_3$, $x'_4$ in FIG. 2c are not the same as the true edges $x_1$, $x_2$, $x_3$, $x_4$, respectively.

In addition to the threshold algorithm, other edge determination algorithms which have been used include 1) Minimum—where edge is assumed to be signal minimum; 2) Maximum—where edge is assumed to be signal maximum; and 3) Maximum slope—where edge is assumed to be at the point of the profile with the highest slope.

It is well known in the metrology field that current edge determination algorithms are not adequate. In the field of optical microscopy, D. Nyyssonen and R. Larrabee have shown in *J. Res. Natl. Bur. Stds.* Vol. 91, pp. 187–204 (1987) that the threshold value which corresponds to the true linewidth is highly dependent on the exact thickness of the patterned films, because of thin film interference effects. These effects greatly impact the accuracy of optical microscopy dimensional measurements of microstructures on wafers. In the field of SEM metrology, M. Rosenfield has shown in SPIE, Vol. 775, pp. 70–79 (1987) that the best threshold level varies from sample to sample, again impacting precision.

The problem of determining edges from signal profiles is an important one, and much attention has been devoted to it. Sophisticated methods of profile smoothing and statistical fitting techniques have been applied, but the basic algorithms are essentially the same as mentioned above. Accordingly, there is a long-felt need to improve the accuracy of edge determination and measurement in image analysis, especially relating to lithographically produced objects on semiconductors.

Bearing in mind the problems and deficiencies of the prior art, it is therefore an object of the present invention to provide a method of detecting and measuring edges of features using imaging apparatus whereby greater accuracy than has been attained in the past is achieved.

It is another object of the present invention to provide an improved method of detecting and measuring edges of features using available metrology imaging apparatus.

A further object of the invention is to provide an improved method of detecting and measuring edges of features which does not require additional parameters to be input, such as threshold values.

It is yet another object of the present invention to provide an improved method of detecting and measuring edges of features which results in smaller line width offsets and more tolerance to process variations.

Still other objects and advantages of the invention will in part be obvious and will in part be apparent from the specification.

SUMMARY OF THE INVENTION

The above and other objects which will be apparent to those skilled in the art are achieved in the present invention which provides a method of determining the edge of an object by microscopy. There is first provided an object whose edge is to be detected on a background which contrasts with the object and a microscopy system having image signal profile capabilities, such as an optical microscopy system or a scanning electron microscopy system. The edge of the object is viewed with the microscopy system at a first focus value, and the image signal profile of the object edge is then measured at the first focus value. The object edge is then viewed at a second focus value different from the first focus value and the image signal profile of the object edge is measured at the second focus value. The location of the object edge is determined by comparing the image signal profiles of the object edge at the first and second focus values.

In one aspect, determination of the location of the object edge is by comparing the image signal profiles of the object edge at the first and second focus values and determining an isofocal point of the profiles.

In another aspect, prior to the determination of the location of the object edge, the object edge is viewed at a third focus value different from the first and second focus values and the image signal profile of the object edge is measured at the third focus value. Determination of the location of the object edge is then made by comparing the image signal profiles of the object edge at the first, second and third focus values, preferably by calculating the variance of the profiles and determining a minimum of the variance. A data fit routine may be utilized to determine the minimum of the variance.

The object edge may be viewed and the image signal profiles measured at different phases or different light colors, and the determination of the location of the object edge may include comparing the image signal profiles of the object edge at the different phases or different light colors.

The image signal profiles may be determined by discontinuous scanning at a finite point spacing. Determination of the location of the object edge may be made without setting a threshold value for the image signal profiles of the object edge.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2b is a signal profile from the image of the test lines of FIG. 2a.

DESCRIPTION OF THE PREFERRED EMBODIMENT(S)

In describing the preferred embodiment of the present invention, reference will be made herein to FIGS. 3–7 of the drawings in which like numerals refer to like features of the invention. Features of the invention are not necessarily shown to scale in the drawings.

Figure 4:
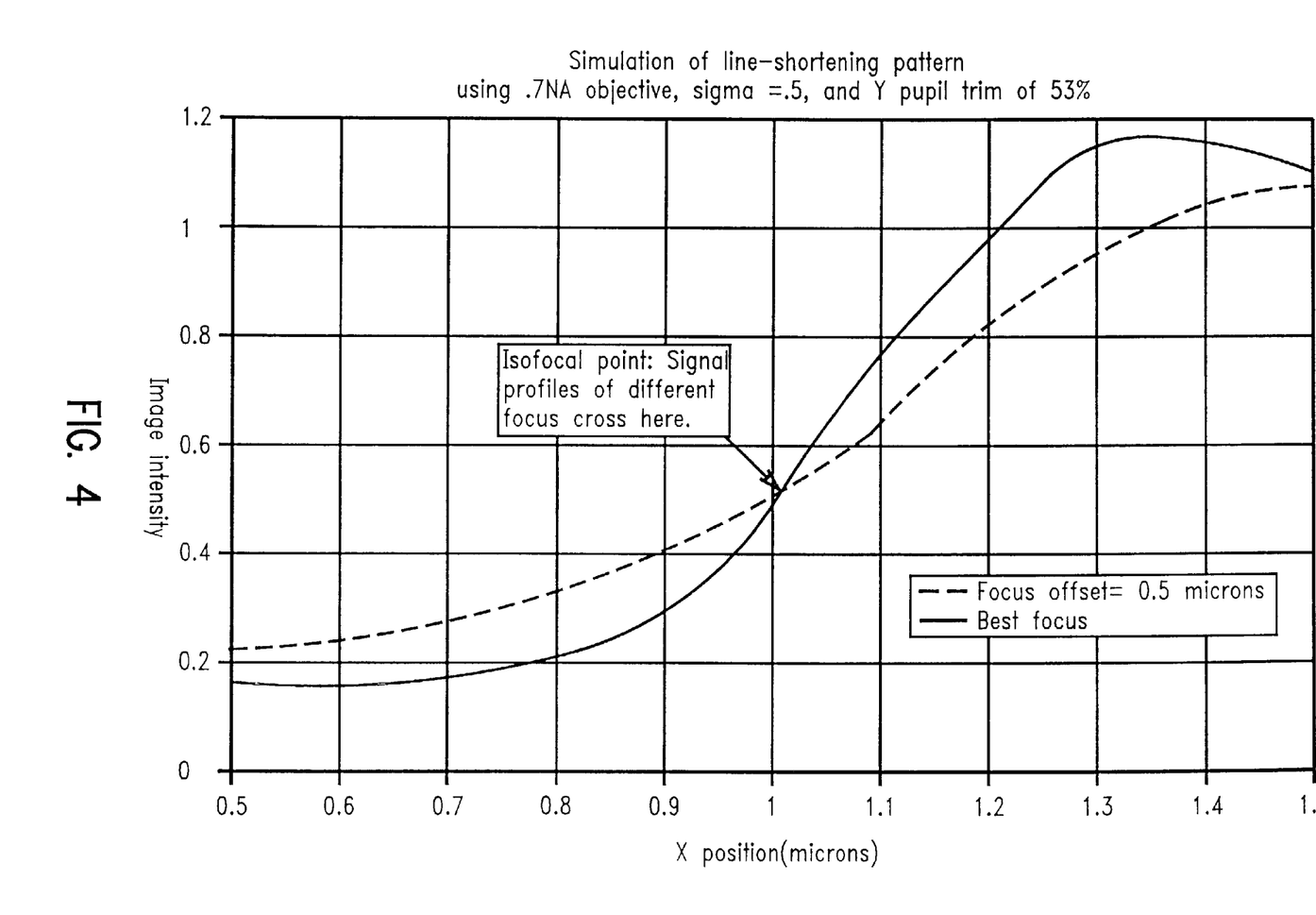
FIG. 4 is a graphical illustration of isofocal point of an object edge as determined by one method of the present invention.

The isofocal method utilized in the present invention provides a new way of determining an edge location from the analysis of signals from imaging equipment. The previously discussed prior art algorithms normally operate on signal profiles at "best focus". The isofocal algorithm and method of the present invention uses signal profiles from more than one focus. The "isofocal point" occurs at the place where signal profiles with different focus cross each other, as illustrated in FIG. 4, which will be discussed further below. In utilizing the algorithm and method of the present invention, there is no need for the user to input a threshold level. In one sense, the present invention isofocal algorithm and method automatically set the threshold, and this level can vary from sample to sample.

The present method of isofocal edge determination is applicable to linewidth measurement and overlay measurement in semiconductor production metrology. In addition, this algorithm may be applied to a wafer alignment system where an imaging system is used to determine the center position of a fiducial mark on the wafer. An example of such a wafer alignment system is the AXIOM system used by SVG Lithography, and described by S. Drazkieweicz et al. in SPIE, Vol. 2726, pp. 886–899. Other practical applications are possible in other fields.

The present method is applicable to different types of imaging apparatus, such as an optical microscope or SEM. The measurement apparatus should include a means of changing the image focus, so that signal profiles can be collected at controlled focus offsets, and observing where the profiles cross each other. The new measurement method is, however, independent of focus position, and can be used for more accurate determinations of dimensional information, such as linewidth and center position of a test object. Specifically, this approach has applications in the measurements of patterns on wafers and reticles used in the IC fabrication process. The method of the present invention can be implemented on existing tools such as the Biorad Questar metrology tool by modifying the software to the methods as discussed below.

Figure 3:
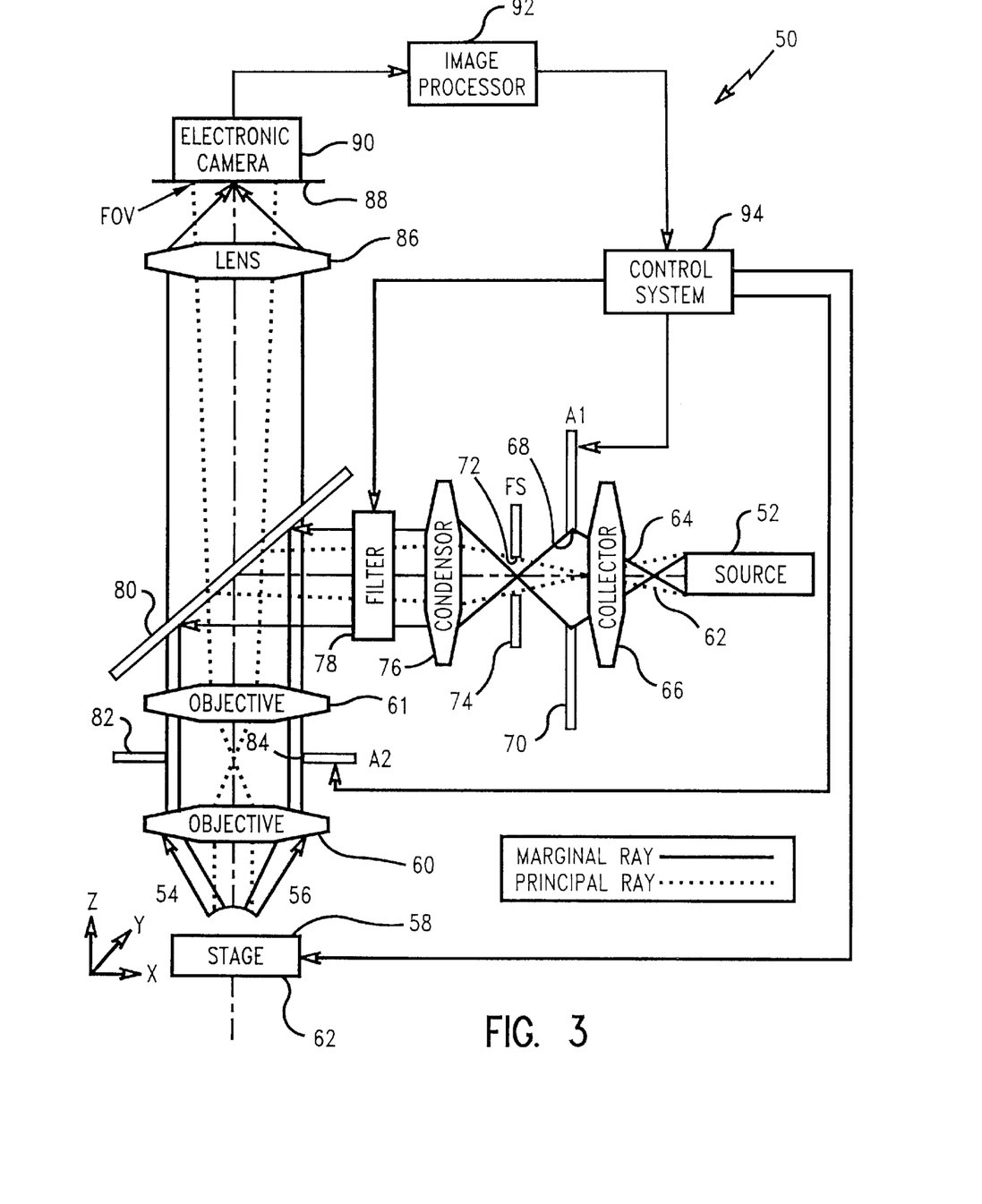
FIG. 3 is a block diagram of optical microscope measuring apparatus which may be used in connection with the present invention.

As an example of the use of the method of the present invention method, a preferred optical metrology tool and system 50 is depicted in schematic form in FIG. 3. The example shown is of a bright-field optical microscope system, although other optical configurations are contemplated in accordance with the present invention, such as, dark-field, phase-contrast, and diffraction-based systems akin to those commonly found in lithography tool alignment systems.

Bright-field optical metrology is applied to the measurement of both critical dimension and overlay in the semiconductor manufacturing process. In FIG. 3, a broadband light source 52 projects light from an illumination system onto a substrate 54 containing an object 56 in object plane 58 of an objective lens 60. Substrate 54 is mounted on a stage 62 which is movable in X and Y directions (in the object plane) and in the Z direction (normal to the object plane, toward and away from lens 60). The illumination comprises principal rays 62 and marginal rays 64 which pass from source 52 through collector lens 66. An aperture 68 positioned in a plane 70 conjugate to the exit pupil of the objective lens 60, 61 determines the partial coherence of the illumination. A field stop opening 72, positioned in a plane 74 conjugate to the object plane determines the area illuminated on the substrate. After passing through condenser lens 76, the light rays 62, 64 enter wavelength filter 78 which selectively transmits a subset of the band of wavelengths emitted by source 52.

A partially reflective beam splitter mirror 80 redirects the illumination rays at a 90 degree angle into the microscope objective lens. The objective lens typically consists of multiple lens elements, shown schematically in FIG. 3 as a pair of lenses 60, 61, with pupil plane 82 internal to the lens, as shown. The partial coherence of the optical system is normally determined by the degree to which the illumination fills the aperture 84 in pupil plane 82. The greater the area filled, the less coherent the illumination. Aperture 84 also determines the maximum angle of the diffracted rays collected by the objective and, hence, the resolving power of the objective.

After being reflected from substrate 54 on object plane 58 on movable stage 62, the collected image is passed back through objective lenses 60, 61, straight through beam splitter 80 and is projected onto electronic camera 90, typically a CCD array located in image plane 88. Lens 86 focuses the image onto the CCD array on plane 222. The output from camera 90 may be electronically filtered and analyzed by image processor 92. In the optical metrology system of the present invention, the image processor is adapted to provide an image signal profile across an edge of a test line or other object on the substrate which contrasts with the background of the substrate. The various functions of the microscope, namely, image focus, aperture settings, filter selection, illumination level, etc., are managed by a central microprocessor control system 94.

The control system can command changes in focus by moving sample stage 62 in the Z direction. The signal profile is derived from the electronic camera and the image processor as a non-continuous sample at the camera pixel spacing, and may be smoothed or averaged along the line to be measured. The signal profile is represented as S(x,z) where x is the scan direction and z is the focus.

The isofocal point may be determined in two ways. In the first way, signal profiles from two different focuses are obtained, and the crossing point is determined. If $Z_{best}$ represents the position of best focus, then the profiles S(x, $z_{best}$) and S(x, $z_{best}+\Delta Z$) are used, where $\Delta Z$ is a predetermined focus offset. This situation is illustrated in FIG. 4. If the curves do not cross, an error code would be generated. In the case that the curves cross more than once, it will be necessary to choose from among the multiple potential edges. This problem can occur with prior art threshold methods as well.

Figure 5:
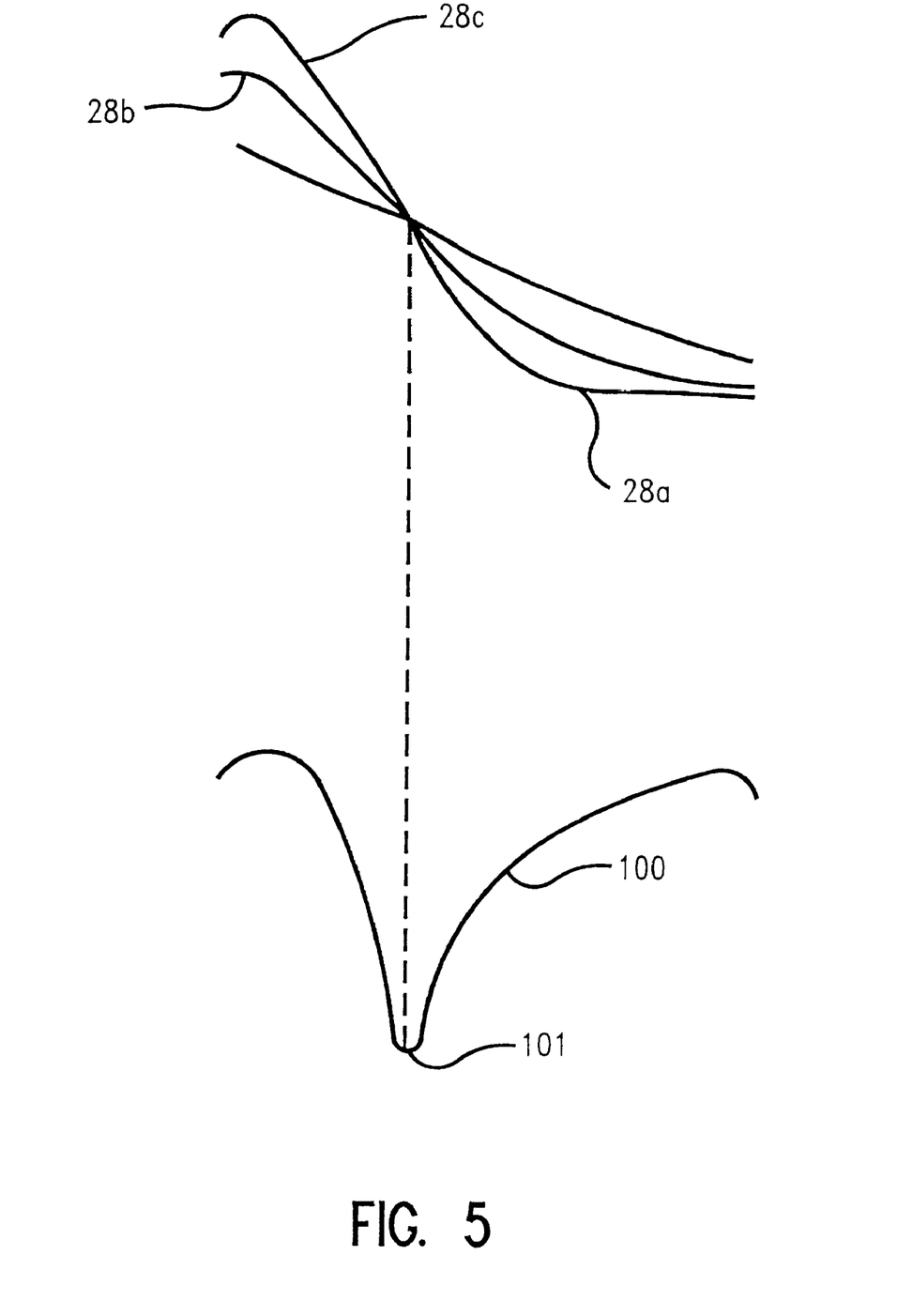
FIG. 5 is a statistical determination of isofocal point by finding minimum variance as determined by another method of the present invention.

A second way to determine the isofocal point is to use signal profiles from more than two different focuses. Let $\{z_1, z_2, \ldots z_n\}$ represent n different focus values which have been predetermined. A measure of the variation of the signal with focus can be defined at each scan position X. The variance $\sigma^2$ (x) may be calculated from the following equation:

$$\sigma^2(x) = \frac{1}{n-1} \sum_i [S(x; z_i) - \overline{S}(x)]^2$$

where $\overline{S}(x)$ is the mean value of the signal at scan position x. This situation is illustrated in FIG. 5 which shows a collection of signal profiles 28a, 28b, 28c at three different focuses, and a plot 100 of the variance of the signal profiles. The edge position is determined to be the minimum point 101 of the variance. The scan dimension x is usually not a continuous variable but is rather sampled at some pixel spacing, e.g., every 20 nm. Statistical techniques can be used to interpolate the minimum, and give better precision than the pixel spacing. One approach is to use a data fit routine, for example, to fit the data near the minimum to a parabola, and analytically determine the minimum position.

Figure 6:
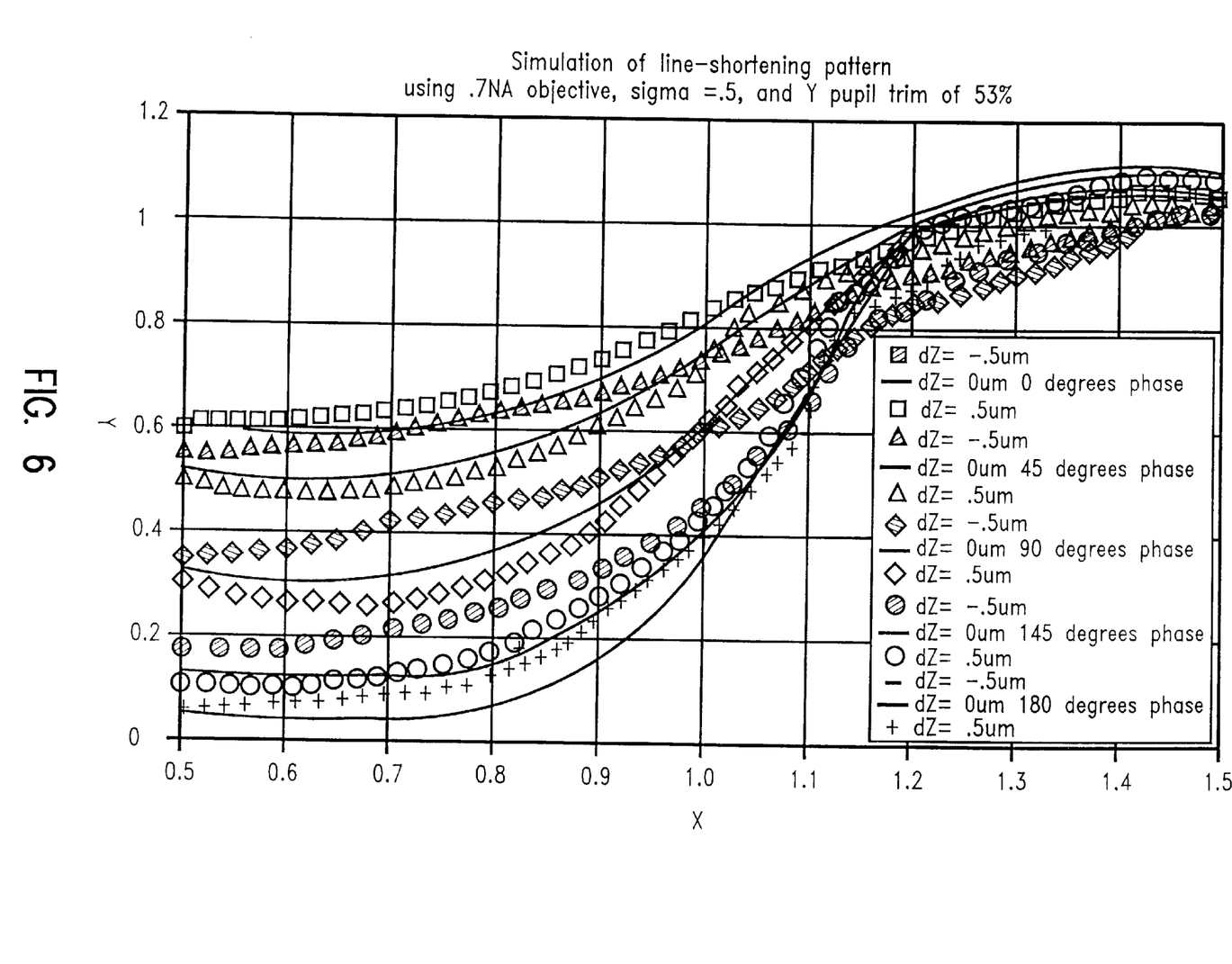
FIG. 6 is a graphical representation of a simulation of signal profiles for line-shortening pattern with various phases and focus values, wherein the isofocal point is very close to the edge of the pattern at X=1.

The isofocal algorithms and methods of the present invention have been shown to have significant advantages in line-shortening metrology, also known as Optical CD (critical dimension), as disclosed in U.S. patent application Ser. No. 08/359,797 filed Dec. 20, 1994, now U.S. Pat. No. 5,629,772, and Ser. No. 08/560,851 filed Nov. 20, 1995, now U.S. Pat. No. 5,757,507, the disclosures of which are hereby incorporated by reference. Simulations of signals from a line-shortening pattern viewed with an optical microscope are illustrated in FIG. 6, which shows a plot of simulated signal profiles for five (5) different pattern phases, and three (3) different focuses for each phase. The true edge position assumed in the simulation is at X=1.0 microns in the center of the X-axis of the graph. For each phase, the isofocal point is substantially at the true edge. For 0 degrees phase, both the isofocal point and the 50% threshold edge are within a few nm of the true edge. On the other hand, for 180° phase the 50% threshold edge is at roughly 1.1 nm, a 100 nm error. The isofocal edge is at roughly 1.03, which is three times less error than the threshold value. These simulation results suggest that the isofocal algorithm is able to tolerate variations in sample phase better than the standard threshold algorithm of the prior art.

Figure 7:
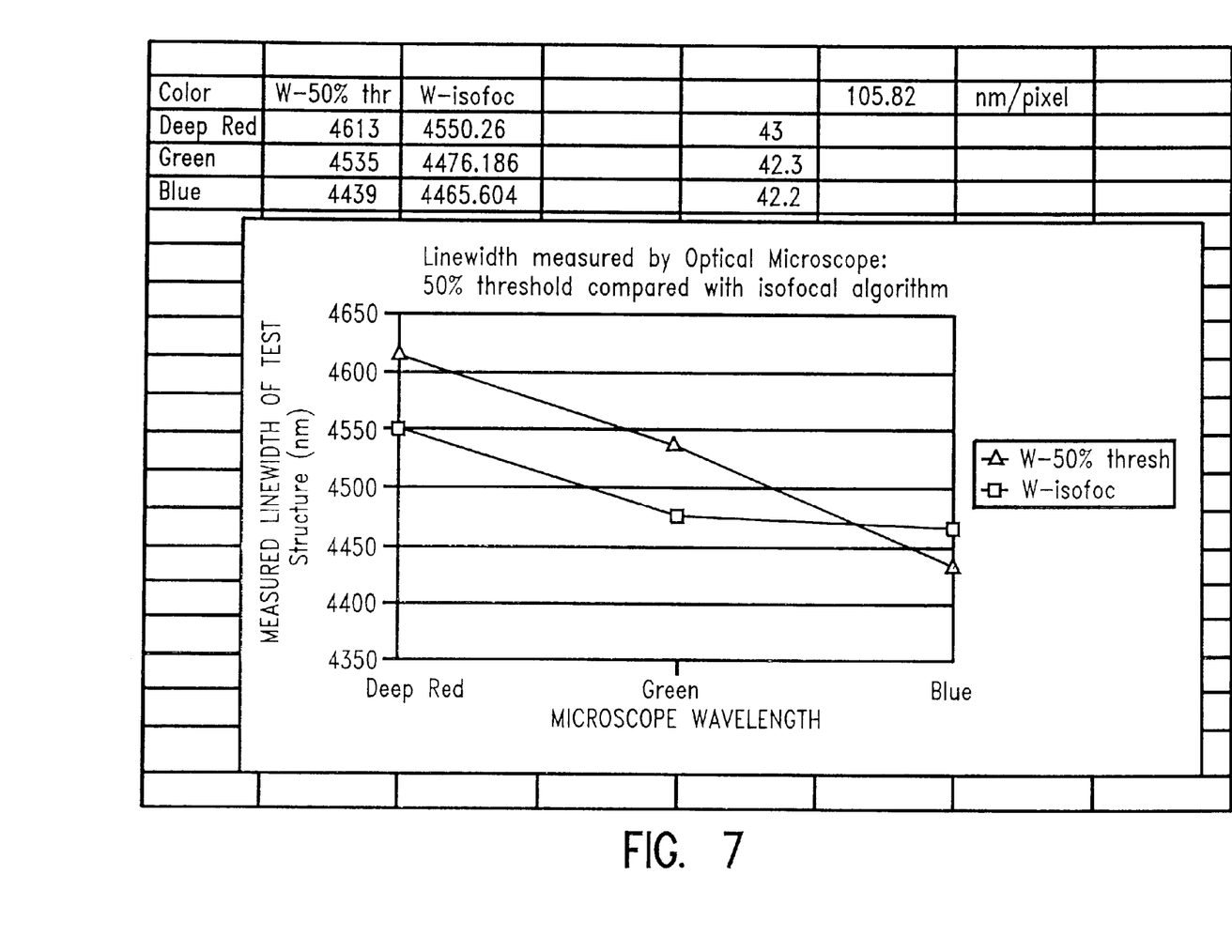
FIG. 7 is a graphical representation of experimental data from a line-shortening pattern measured in a Biorad Q6 microscope using several different color filters, wherein the isofocal algorithm of the present invention shows less variation than the threshold algorithm.

FIG. 7 illustrates experimental results gathered from a line-shortening pattern on the Biorad optical metrology tool. Data was taken using several different color filters. Ideally, the measurement value should not depend on the color chosen. FIG. 7 shows a plot of measured results using either a 50% threshold or the isofocal algorithm. The variation of the width with color is 17 nm for the threshold algorithm, and is 9 nm for the isofocal algorithm. This represents almost a factor of two less sensitivity to color, and is a significant advantage.

The basic algorithm and method of the present invention is universal, and can be applied to any imaging metrology tool. The effectiveness of this approach has been tested both by other simulations and experiments. These other cases used unresolved test structures of the type proposed by the inventors of the present invention in U.S. patent application Ser. No. 08/643,138, filed May 2, 1996, the disclosure of which is hereby incorporated by reference.

This other simulation utilized a 350 nm L/S Optical CD pattern with 2 micron long lines. An image simulation was done for the Biorad microscope, assuming various resist thickness of this pattern. The usual 50% threshold algorithm gave a linewidth which varied by 196 nm as thickness changed. The isofocal edge algorithm was found to give a linewidth which varied by only 70 nm over this same thickness range, thereby providing an almost three-fold smaller variation.

An experiment was done by looking at raw signal profiles from the Biorad microscope at several defocus values. Again, a sub-resolution pattern was used as the test object. Signal profiles were collected using three different spectral bands, i.e., colors. Using a 50% threshold algorithm, the linewidth was observed to change by roughly 170 nm in changing from the deep red band to the blue band, showing a large systematic wavelength dependence. When the data was analyzed using the isofocal algorithm, an 86 nm linewidth variation was observed over the same wavelength range, again showing a considerable improvement.

Both simulation and experiment have shown factors of two to three-fold reductions in linewidth variation with wavelength or resist thickness when using this new isofocal metrology method. This is a key advantage, since linewidth offsets which depend on details of the sample, e.g., resist thickness, are very undesirable. There are several other advantages of this method, including smaller linewidth offsets, greater accuracy, and more tolerance to process variations. Another advantage is that the present algorithm and method do not require additional parameters, such as a threshold value, to be determined by the process engineer.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of determining the edge of an object by microscopy comprising the steps of:
   a) providing an object whose edge is to be detected on a background which contrasts with the object;
   b) providing a microscopy system having image signal profile capabilities;
   c) viewing the edge of said object with said microscopy system at a first focus value;
   d) measuring the image signal profile of the object edge at said first focus value;
   e) viewing said object edge with said microscopy system at a second focus value different from said first focus value;
   f) measuring the image signal profile of said object edge at said second focus value; and
   g) determining the location of said object edge by comparing said image signal profiles of said object edge at said first and second focus values.

2. The method of claim 1 wherein said step (g) determination of the location of said object edge is by comparing said image signal profiles of said object edge at said first and second focus values and determining an isofocal point of said profiles.

3. The method of claim 1 further including, prior to step (g), the steps of:
   i) viewing said object edge with said microscopy system at a third focus value different from said first and second focus values;
   ii) measuring the image signal profile of said object edge at said third focus value;
and wherein said step (g) determination of the location of said object edge is by comparing said image signal profiles of said object edge at said first, second and third focus values.

4. The method of claim 3 wherein said step (g) determination of the location of said object edge is by comparing said image signal profiles of said object edge at said first, second and third focus values, calculating the variance of said profiles and determining a minimum of said variance.

5. The method of claim 4 wherein said step (g) determination of the location of said object edge utilizes a data fit routine to determine the minimum of said variance.

6. The method of claim 1 wherein said object edge is viewed using an optical microscopy system to generate said image signal profiles.

7. The method of claim 1 wherein said object edge is viewed using a scanning electron microscopy system to generate said image signal profiles.

8. The method of claim 1 further including viewing said object edge at different light phases and measuring said image signal profiles at said different phases, and wherein said step (g) determination of the location of said object edge includes comparing said image signal profiles of said object edge at said different phases.

9. The method of claim 1 further including viewing said object edge at different light colors and measuring said image signal profiles at said different colors, and wherein said step (g) determination of the location of said object edge includes comparing said image signal profiles of said object edge at said different colors.

10. The method of claim 1 wherein said image signal profiles are determined by discontinuous scanning at a finite point spacing.

11. The method of claim 1 wherein said step (g) determination of the location of said object edge is made without setting a threshold value for said image signal profiles of said object edge.

12. A method of determining the edge of an object by microscopy comprising the steps of:
   a) providing an object whose edge is to be detected on a background which contrasts with the object;
   b) providing a microscopy system having image signal profile capabilities selected from the group consisting of optical microscopy systems and scanning electron microscopy systems;
   c) viewing the edge of said object with said microscopy system at a first focus value;
   d) measuring the image signal profile of the object edge at said first focus value;
   e) viewing said object edge with said microscopy system at a second focus value different from said first focus value;

f) measuring the image signal profile of said object edge at said second focus value; and g) determining the location of said object edge by comparing said image signal profiles of said object edge at said first and second focus values and determining an isofocal point of said profiles.

13. The method of claim 12 further including viewing said object edge at different light phases and measuring said image signal profiles at said different phases, and wherein said step (g) determination of the location of said object edge includes comparing said image signal profiles of said object edge at said different phases.

14. The method of claim 12 further including viewing said object edge at different light colors and measuring said image signal profiles at said different colors, and wherein said step (g) determination of the location of said object edge includes comparing said image signal profiles of said object edge at said different colors.

15. The method of claim 12 wherein said image signal profiles are determined by discontinuous scanning at a finite point spacing.

16. The method of claim 12 wherein said step (g) determination of the location of said object edge is made without setting a threshold value for said image signal profiles of said object edge.

17. A method of determining the edge of an object by microscopy comprising the steps of:

a) providing an object whose edge is to be detected on a background which contrasts with the object;

b) providing a microscopy system having image signal profile capabilities;

c) viewing the edge of said object with said microscopy system at a first focus value;

d) measuring the image signal profile of the object edge at said first focus value;

e) viewing said object edge with said microscopy system at a second focus value different from said first focus value;

f) measuring the image signal profile of said object edge at said second focus value;

g) viewing said object edge with said microscopy system at a third focus value different from said first and second focus values;

h) measuring the image signal profile of said object edge at said third focus value; and i) determining the location of said object edge by comparing said image signal profiles of said object edge at said first, second and third focus values.

18. The method of claim 17 wherein said step (i) determination of the location of said object edge is by comparing said image signal profiles of said object edge at said first, second and third focus values, calculating the variance of said profiles and determining a minimum of said variance.

19. The method of claim 18 wherein said step (i) determination of the location of said object edge utilizes a data fit routine to determine the minimum of said variance.

20. The method of claim 17 wherein said object edge is viewed using an optical microscopy system to generate said image signal profiles.

21. The method of claim 17 wherein said object edge is viewed using a scanning electron microscopy system to generate said image signal profiles.

22. The method of claim 17 further including viewing said object edge at different light phases and measuring said image signal profiles at said different phases, and wherein said step (i) determination of the location of said object edge includes comparing said image signal profiles of said object edge at said different phases.

23. The method of claim 17 further including viewing said object edge at different light colors and measuring said image signal profiles at said different colors, and wherein said step (i) determination of the location of said object edge includes comparing said image signal profiles of said object edge at said different colors.

24. The method of claim 17 wherein said image signal profiles are determined by discontinuous scanning at a finite point spacing.

25. The method of claim 17 wherein said step (i) determination of the location of said object edge is made without setting a threshold value for said image signal profiles of said object edge.

* * * * *